US009372756B2

(12) United States Patent
Vandikas et al.

(10) Patent No.: US 9,372,756 B2
(45) Date of Patent: Jun. 21, 2016

(54) RECOVERY OF OPERATIONAL STATE VALUES FOR COMPLEX EVENT PROCESSING BASED ON A TIME WINDOW DEFINED BY AN EVENT QUERY

(71) Applicant: Telefonaktiebolaget L M Ericsson (publ), Stockholm (SE)

(72) Inventors: Konstantinos Vandikas, Solna (SE); Paris Carbone, Solna (SE); Farjola Peco, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 215 days.

(21) Appl. No.: 14/273,207

(22) Filed: May 8, 2014

(65) Prior Publication Data

US 2014/0351639 A1 Nov. 27, 2014

Related U.S. Application Data

(60) Provisional application No. 61/826,095, filed on May 22, 2013.

(51) Int. Cl.
*G06F 11/00* (2006.01)
*G06F 11/14* (2006.01)

(52) U.S. Cl.
CPC .................. *G06F 11/1438* (2013.01)

(58) Field of Classification Search
CPC .................. G06F 11/1438; G06F 11/1448
See application file for complete search history.

(56) References Cited

U.S. PATENT DOCUMENTS

| 2010/0235681 A1* | 9/2010 | Suetsugu | G06F 11/1471 714/15 |
| 2010/0262862 A1* | 10/2010 | Watanabe | G06F 11/1471 714/19 |
| 2010/0293532 A1* | 11/2010 | Andrade | G06F 11/1438 717/140 |
| 2012/0084317 A1* | 4/2012 | Sakamoto | G06F 17/30516 707/769 |
| 2013/0132560 A1* | 5/2013 | Hudzia | H04L 47/283 709/224 |
| 2014/0304545 A1* | 10/2014 | Chen | G06F 9/3863 714/4.3 |
| 2014/0304549 A1* | 10/2014 | Hsu | G06F 11/0793 714/15 |

* cited by examiner

*Primary Examiner* — Philip Guyton
(74) *Attorney, Agent, or Firm* — Myers Bigel & Sibley, P.A.

(57) ABSTRACT

Methods by a processing system are disclosed that control recovery of operational state values of a complex event processing (CEP) engine that processes values of events. A window size is determined based on a property of an event query. Events' values are retrieved from a distributed log which are restricted to occurring within a timeframe defined based on the window size. The distributed log stores events' values that have been processed by the CEP engine. The retrieved events' values are replayed to the CEP engine for processing to recover the operational state values of the CEP engine. Related processing systems are disclosed that control recovery of operational state values of a CEP engine that processes values of events.

10 Claims, 5 Drawing Sheets

RECOVERY OF OPERATIONAL STATE VALUES FOR COMPLEX EVENT PROCESSING BASED ON A TIME WINDOW DEFINED BY AN EVENT QUERY

CROSS REFERENCE TO RELATED APPLICATIONS

This application claims priority to U.S. Provisional Application No. 61/826,095, filed May 22, 2013, the disclosure and content of which is incorporated herein by reference in its entirety as if set forth fully herein.

TECHNICAL FIELD

The present disclosure relates to complex event processing systems and, more particularly, to providing fault tolerance within complex event processing systems.

BACKGROUND

OpenSAF is an Open Source Project established to develop High Availability middleware consistent with Service Availability Forum (SA Forum) specifications. OpenSAF specifications seek to guarantee that if any application crashes in one node (fails) another node, running the same application will take over, and the node that crashed will be restarted. These operations can be performed agnostically to what kind of application a node was running. As such OpenSAF is ignorant to the operational state of the applications that are running on each node. Operational state is maintained among nodes actively using N-way replication but if a particular node crashes OpenSAF has no inherent mechanism for recovering the node that has crashed to its original state. A specific class of applications that is severely impacted by this limitation are Complex Event Processing (CEP) applications.

Commercially available CEP systems include Esper HA, Oracle CEP, Sybase ESP, and Websphere Business Events which can be deployed across a plurality of event processing modules that can, in turn, be deployed across a plurality of separate physical processing nodes ("CEP nodes" and "nodes") that are communicatively networked together or deployed on a single processing node (e.g., as virtual machine processes operating under control of a virtual hypervisor). These CEP systems support deployment of serialization in each event processing module. Serialization is the process of translating data structures or object state within an event processing module (or CEP node) into a format (structure) of values that can be stored (for example, in a file or memory buffer, or transmitted across a network connection link) and "resurrected" later in the same or another event processing module (or CEP node). When the resulting series of bits is reread according to the serialization format, it can be used to create a semantically identical clone of the original event processing module (or CEP node), including its operational state values.

When serialization is supported or active, checkpoints can be taken periodically to capture the operational state values of the CEP system. Through checkpoints and serialization, when an event processing module (or CEP node) recovers from a failure, the most recent checkpoint will be used in order to recover the operational state values of the event processing module (or CEP node) to its most up-to-date state prior to the failure.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY

Some embodiments are directed to a method by a processing system to control recovery of operational state values of a complex event processing (CEP) engine that processes values of events. A window size is determined based on a property of an event query. Events' values are retrieved from a distributed log which are restricted to occurring within a timeframe defined based on the window size. The distributed log stores events' values that have been processed by the CEP engine. The retrieved events' values are replayed to the CEP engine for processing to recover the operational state values of the CEP engine.

A potential advantage of this method is that it may overcome one or more of the problems explained above by providing a window manager that uses properties of the event query, such as the window size, to control which of the events stored (e.g., logged) in the distributed log are used to restore the operational state values of a CEP engine and to bring the CEP engine back to, for example, the most up-to-date state that occurred prior to a defined condition (e.g., failure) that triggered the restoration. This method may decrease the amount of memory that is being used by the processing system for purposes of restoration and may furthermore decrease processor utilization by the CEP engine during the recovery process since the most relevant historical events are being used.

Some other embodiments are directed to a processing system that controls recovery of operational state values of a CEP engine which processes values of events. The processing system includes a processor and a memory. The memory is coupled to the processor and includes computer readable program instructions that when executed by the processor causes the processor to perform operations. The operations include determining a window size based on a property of an event query, and retrieving events' values, from a distributed log, that are restricted to occurring within a timeframe defined based on the window size. The distributed log stores events' values that have been processed by the CEP engine. The operations further include replaying the retrieved events' values to the CEP engine for processing to recover the operational state values of the CEP engine.

It is noted that aspects described herein with respect to one embodiment may be incorporated in different embodiments although not specifically described relative thereto. That is, all embodiments and/or features of any embodiments disclosed herein can be combined in any way and/or combination. Moreover, methods, processing systems, and/or computer program products according to embodiments will be or become apparent to one with skill in the art upon review of the following drawings and detailed description. It is intended that all such additional methods, processing systems, and/or computer program products be included within this description and protected by the accompanying claims.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings.

DETAILED DESCRIPTION

Figure 1:
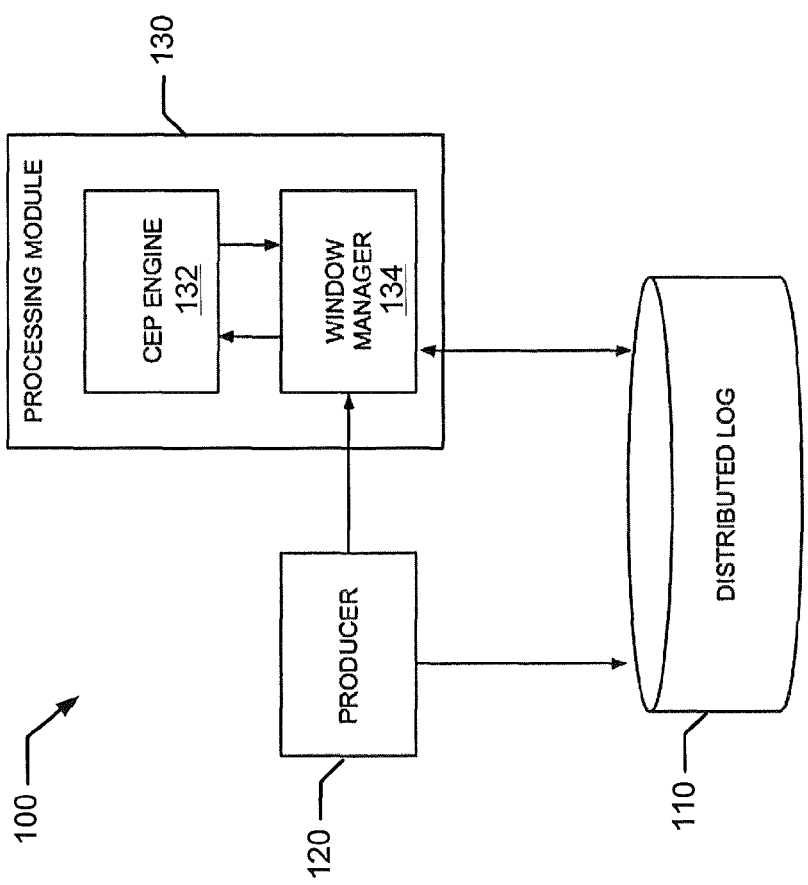
FIG. 1 is a block diagram of a complex event processing system that is configured to operate according to some embodiments.

The invention will now be described more fully hereinafter with reference to the accompanying drawings, in which embodiments of the invention are shown. This invention may, however, be embodied in many different forms and should not be construed as limited to the embodiments set forth herein.

In existing CEP systems, checkpoints are generated in a periodic fashion. Because the frequency of generation of the checkpoints is fixed and independent from properties of a query, which the CEP system is currently processing, an unnecessarily large amount of events can be stored for use in recovering a state of the CEP system.

For example, CEP systems utilize a query language for the purposes of formulating what should be extracted (or inferred) from a continuous stream of data values. Two examples of such query languages follow:

1. Complex Event Query Equivalent (CQL):
CQL
Select temp
From SensorTemper [Range 10 minutes]
Where temp>30
2. Event Processing Language (EPL): Used by Esper
select avg(duration) from
SIPInvite(from="*@ericsson.com).std.groupwin(company).win:ext_timed(ts, 1 minute)

In this example, Esper uses EPL in order to analyze Session Initiation Protocol (SIP) invites in an IP Multimedia Subsystem (IMS) network.

A target CEP engine with that EPL query deployed would perform a checkpoint process that maintains a different time window per company defined by the event query to compute and output a per minute average duration of SIP INVITES per company. Consequently, if the CEP engine is currently processing an event SIPInvite( . . . ts=14:00), no events before ts:13:00 are needed for the CEP engine to replay (process) for recovery of operational state values.

However, because the checkpoint process is decoupled from the properties of the time window, defined based on the EPL query, additional earlier occurring historical events recorded (logged in a memory device) are used by a process to recover the CEP engine. This results in unnecessary usage of memory and more-than-needed serialization processing tasks during the recovery process. Moreover, during this process the CEP engine can be unavailable for processing incoming events. One alternative approach to attempt to reduce these problems would be to perform checkpoints more frequently. However, this alternative approach has its own inefficiencies due to the overhead introduced by the more frequent checkpoint process, and may render the CEP system operationally unsuitable for real time complex event processing.

Various embodiments disclosed herein seek to overcome one or more of these problems by providing a window manager that uses properties of the CEP query, such as the window size, to control which of the events that were logged in memory are used to restore the operational state values of a CEP engine and bring the CEP system back to the most up-to-date operational state that occurred prior to a defined condition (e.g., failure) that triggered the restoration. These embodiments can decrease the amount of memory that is being used by the CEP system for purposes of restoration and can furthermore decrease processor utilization by the CEP engine during the process of recovering the CEP engine and CEP system since the most relevant historical events are being used.

Embodiments of a Fault Tolerant CEP System

Example operations and methods of the present disclosure are now explained in the context of a CEP system 100 illustrated in FIG. 1, which is a non-limiting embodiment of the invention. Referring to FIG. 1, the CEP system 100 includes a distributed log 110, a producer 120, and a processing module 130. The processing module 130 includes a window manager 134 and a CEP engine 132. For one or more of the embodiments disclosed herein, the CEP engine 132 is a data stream processing module that processes continuous streams of events to detect correlations between events and infer situations based on defined queries over a defined sliding time window. The CEP engine 132 may process externally or internally timed events.

The distributed log 110 is configured as a fault tolerant distributed storage device. The distributed log 110 may be configured as a key value store or Not Only SQL (NoSQL) storage database. The distributed log 110 can be implemented using products such as Apache Cassandra, Dynamo, Hibari, OpenLink Virtuoso, Project Voldermort, and Riak.

The producer 120 can be a module (e.g., application), executed by a processor circuit, that produces events that are processing by the CEP engine 132. Example events include SIP Invites directed to a network address. For each event produced by the producer 120, the producer 120 can perform the following tasks, such as in a First-In-First-Out (FIFO) order for the produced events: 1) persist values of the event to the distributed log 110 for storage; and 2) disseminate values of the event to the processing module 130 for processing by the CEP engine 132.

The processing module 130 can be configured to function as a fail-fast module via operation of the window manager 134 and the CEP engine 132. The window manager 134 manages which events' values are retrieved from the distributed log 110 and provided as replay input to the CEP engine 132 to perform a recovery process to recover the operational state values of the CEP engine 132 that existed prior to occurrence of one or more defined conditions (e.g., a failure condition).

The window manager 134 operates to serially replay to the CEP engine 132 values of the events that occurred (e.g., were produced by the producer 120 and/or were stored in the distributed log 110) within a timeframe that is determined from a window size based on a property of an event query being processed by the CEP engine 132. Following recovery of the CEP engine 132 to again contain the operational state values that existed prior to occurrence of the defined condition, values of new events produced by the producer 120 are then pushed to the CEP engine 132 for processing according to the event query.

For example, for the above EPL query of "select avg(duration)", the window manager 134 can serially replay values of events that are within a timeframe determined from a window size of the EPL query (i.e., 1 minute), to the CEP engine 132 to recover its operational state values for processing those events according to the process functionality defined by the "select avg(duration)" EPL query.

According to some embodiments of the present disclosure, the CEP engine 132 can run continuous queries, defined by an event query, over externally timed sliding windows. The external timing may be provided to a plurality of processing modules which may reside on the same CEP node (e.g., virtual machine processes operating under control of a virtual hypervisor) or may be distributed across a plurality of CEP nodes that are interconnected via one or more communication networks, so that the timing of sliding windows may be synchronized. Alternatively, a timing source within each CEP engine 132 may be used.

Figure 2:
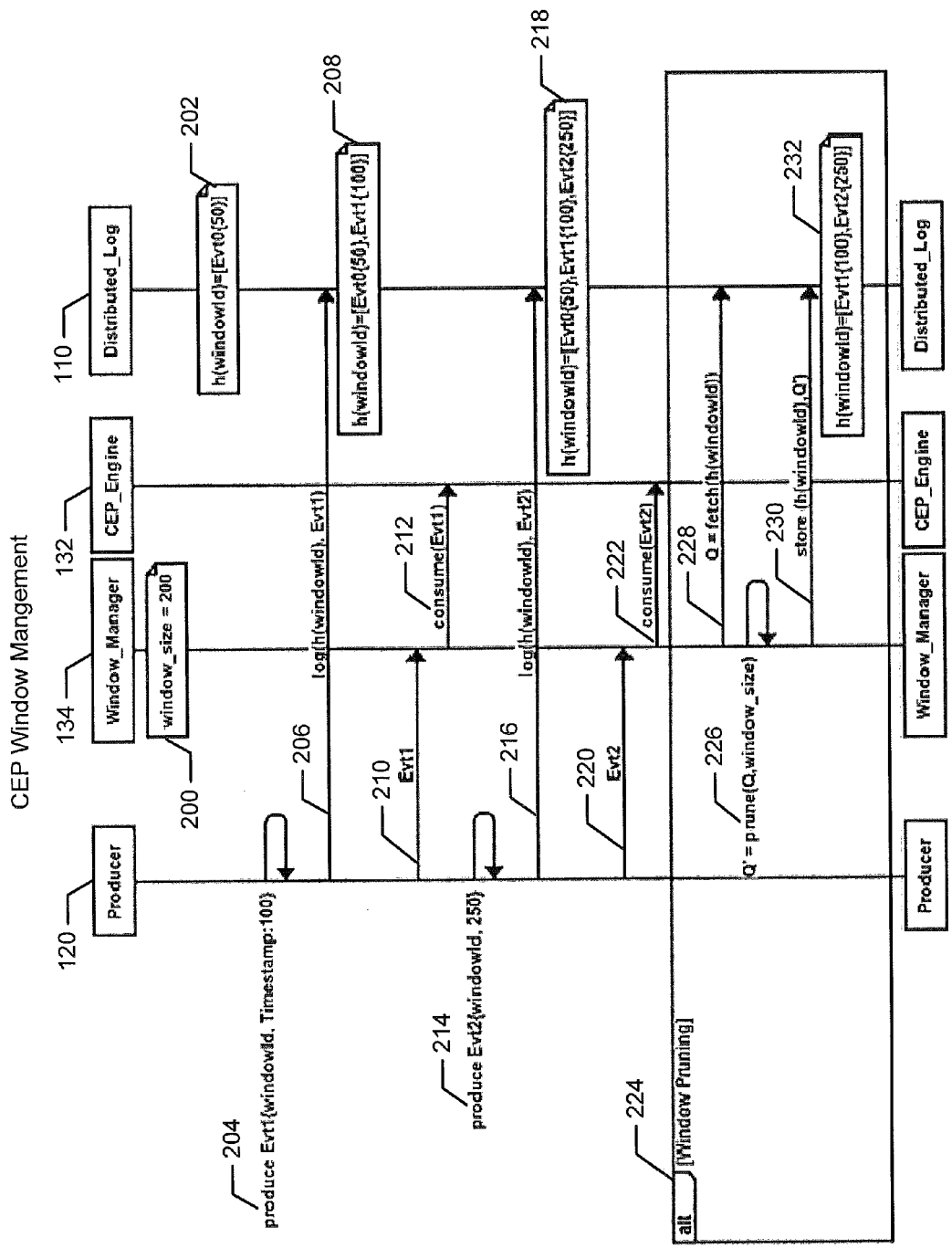
FIG. 2 is a data flow diagram illustrating example operations and methods that determine a window size based on a property of an event query and use the window size to control which events' values are replayed to a CEP engine to recover its operational state in accordance with some embodiments.
Figure 3:
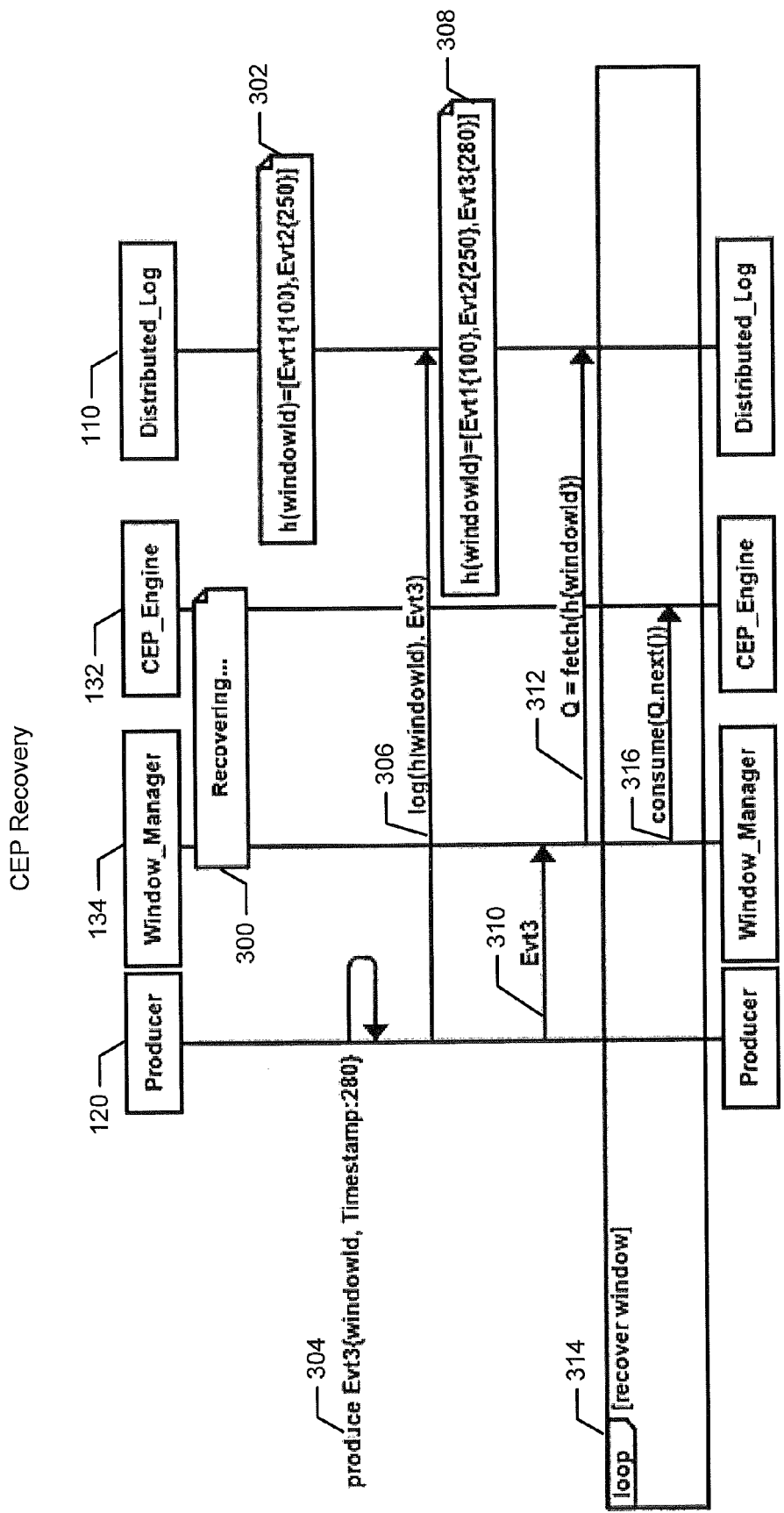
FIG. 3 is a data flow diagram illustrating example operations and methods that replay events' values to a CEP engine to recover its operational state in accordance with some embodiments.

Communications and other interactions between these components of the CEP system 100 are explained below with reference to FIGS. 2 and 3. FIG. 2 is a data flow diagram illustrating example operations and methods that determine a window size based on a property of an event query, and use the window size to control which events' values are serially replayed to a CEP engine to recover its operational state in accordance with some embodiments. FIG. 3 is a data flow diagram illustrating example operations and methods that replay events' values to a CEP engine to recover its operational state in accordance with some embodiments.

FIGS. 2 and 3 refer to the following functions which are defined as follows:
1. produce EvtX{windowId, TimeStamp} is a function that produces event values EvtX that belongs to windowId and has a TimeStamp;
2. h{windowId} is a hash function, h(windowId), that is used in order to identify the register in the distributed log 110 that corresponds to the windowId;
3. log(h(windowId), EvtX) is a function that generates a Log by adding values of event EvtX to the distributed log 110 at the register corresponding to windowId;
4. consume {Evt1} is a function that performs consumption of values of the event Evt1 by the CEP engine 132, using operations defined by an event query;
5. fetch(h(windowId)) is a function that returns Q, which is the values contained in the register corresponding to windowId;
6. store(h(windowId), Q) is a function that replaces the values contained in the register responsible for windowId with values of Q; and
7. prune(Q,windowSize) is a function that prunes values of Q by removing all values of events that are less than windowSize from the last event (outside a timeframe defined based on the windowSize).

Example Window Management Processes

Referring to FIG. 2, values of each event produced by the producer 120 are logged (stored) in the distributed log 110 at the end of the corresponding window queue. While operating under a non-recovery state, the window manager 134 sends values of each event to the CEP engine 132 and prunes the corresponding queue of the distributed log 110 of values of events that are outside of the current window.

As an example, for the purposes of this diagram, the following EPL query has been used:
select count(*) as total_sip_invites from SIP_EVENTS (Request_Line='SIP INVITE').win:ext_timed(Timestamp, 200 milliseconds).

The time value of the example EPL query indicates a time duration of 200 milliseconds over which an operation defined by the EPL query is to be periodically performed on an incoming stream of events' values. The window manager 134 determines that the EPL query performed by the CEP engine 132 has the time value of 200 milliseconds, and correspondingly determines (block 200) a window size of 200 milliseconds based on the time value. The window size determined by the window manager 134 is determined based on the time value of the EPL query (e.g., based on one or more defined relationships) and is not necessarily equal to the time value according to various embodiments.

An event Evt0 has already been logged (block 202) in the distributed log 110. A series of subsequent events (Evt) are produced and logged into the system (Evt1, Evt2, etc.). As shown, the producer 120 produces (block 204) event Evt1 containing values, including a windowId value and a timestamp value of 100 milliseconds, which are provided (flow 206) to the distributed log 110. The distributed log 110 adds (e.g., appends) values of the event Evt 1 to the data structure of the record indexed by windowId (e.g., h(windowId) and having values of the event Evt0, as illustrated in block 208.

Event Evt1 is provided (flow 212) to the CEP engine 132 for processing by operations defined by the EPL query, and is provided (flow 210) to the window manager 134 for use in managing recovery, when needed, of the operational state values of the event engine 132. The CEP engine 132 has a set of operational state values. The operational state values may be values that the CEP engine 132 carries over as an output of processing one event for use in its processing of a subsequent next event, and may include algorithmic output values used to perform functionality defined by the EPL query. For example, for the above EPL query of "select count(*)", the CEP engine 132 develops operational state values from processing Evt0 and Evt1 according to the operations defined by the "select count(*)" EPL query.

The producer 120 subsequently produces (block 214) event Evt2 containing values, including the windowId value and a timestamp value of 250 milliseconds, which are provided (flow 216) to the distributed log 110. The distributed log 110 identifies the register in the distributed log 110 that corresponds to the windowId, and adds (e.g., appends) values of the event Evt2 to the register's data structure having values of the events Evt0 and Evt1, as illustrated in block 218. Event Evt2 is provided (flow 222) to the CEP engine 132 for processing by operations defined by the EPL query, and is provided (flow 220) to the window manager 134 for use in managing recovery, when needed, of the operational state values of the CEP engine 132.

After the CEP engine 132 has processed (consumed) Evt2, preferably in a separate thread, the window manager 134 initiates a pruning process (block 224) that causes values of Evt0 to be evicted (discarded) from the register in the distributed log 110 that corresponds to the windowId since it is outside the 200 milliseconds window size of the EPL query and, therefore, is no longer needed for use in recovery of the CEP engine 132.

The CEP engine 132 performs (flow 228) a fetch, windowId, function that returns values of events Evt0, Evt1, Evt2 (a data structure Q) contained in the register corresponding to the windowId. The CEP engine 132 performs a prune (block 226), prune(q, window_size), that removes (discards) values of events that are less than windowSize from the last event (outside a timeframe defined based on the windowSize). Accordingly, values of event Evt0 are removed (discarded) because they occurred outside the timeframe defined based on the window size of 200 milliseconds (event Evt0 occurred 250 milliseconds earlier and therefore is outside the 200 millisecond window size, while Evt0 occurred 150 milliseconds earlier and therefore is within the 200 millisecond window size). The data structure containing data values of events Evt1 and Evt2 is referred to as Q'.

The CEP engine 132 stores Q' (function store(h(windowId, Q')) by providing (flow 230) Q' values to the distributed log 110, which identifies the register corresponding to windowId for storing (block 232) the Q' values (Evt1, Evt2).

Example Window Recovery Processes

Reference is now made to FIG. 3 which illustrates operations and methods that replay events' values to the CEP engine 132 to recover its operational state. Following a failure condition or another defined or undefined condition, the processing module 130 containing the CEP engine 132 is restarted and results in loss of the operational state values of the CEP engine 132 that existed prior to occurrence of the failure or other condition. A recovering process (block 300) is initiated responsive to loss of the operational state values.

For each produced event that is incoming in an uninitialized window (i.e., windowId, etc.), the window manager 134 fetches values for each of the logged events for the corresponding window (i.e., windowId, etc.) from the distributed log 110. The window manager 134 then replays fetched values for each of the logged events to the CEP engine 132 for processing to recover (recreate) the operational state values of the CEP engine 132 for that window that existed prior to occurrence of the failure or other condition. This recovery process causes the processing module 130 to be fail-fast, such that any failure of its sub-components will terminate the associated process, and the affected sub-component or all sub-components will be started back in sync and recovered to their pre-failure operational states.

By way of further example in the illustrated sequence, events Evt1 and Evt2 are already stored in the distributed log 110 within a register corresponding to windowId, as shown in block 302. The producer 120 produces (block 304) Evt3 which is provided (flow 306), by function, log(h(windowId), Evt3) to the distributed log 110 for storage. The distributed log 110 identifies the register that corresponds to WindowId, and adds (e.g., appends) values of event Evt3 to the register's data structure having values of the events Evt1 and Evt2, as illustrated in block 308. Event Evt3 is provided (flow 310) to the window manager 134.

Because the window manager 134 knows that the operational state values of the CEP engine 132 were lost due to restarting, the CEP engine 132 performs a process (block 314) to recover the operational state values of the CEP engine 132 that existed prior to occurrence of the failure or other condition. Through the recovery process (block 314), the window manager 134 retrieves (flow 312) the events' values (for events Evt1, Evt2 and Evt3) from the distributed log 110, and replays (flow 316) the retrieved values of the events, in their respective order of production by the producer 304, to the CEP engine 132 for processing according to the operations defined by the EPL query to recover the operational state values of the CEP engine 132.

In the example of FIG. 3, the window manager 134 first plays (provides) values of Evt1 to the CEP engine 132 for processing (consume(Q.next( )) by operations of the "select count(*)" EPL query to generate updated operational state values. The window manager 134 then plays values of Evt2 to the CEP engine 132 for processing by operations of the "select count(*)" EPL query to generate further updated operational state values that existed prior to occurrence of the failure or other condition. The window manager 134 next plays values of Evt3 to the CEP engine 132 for processing by operations of the "select count(*)" EPL query to generate further updated operational state values.

Because the operational state values of the CEP engine 132 are now updated, the process of FIG. 2 can be further repeated to provide values of further events produced by the producer 204 to the windows manager 134, the CEP engine 132, and the distributed log 110, to enable later recovery of the operational state values of the CEP engine 132 if a subsequent failure or other condition occurs.

Potential Advantages Provided by at Least Some Embodiments

Various embodiments disclosed herein may thereby overcome one or more of the problems explained above by providing a window manager that uses properties of the CEP query, such as the window size, to control which of the events that were logged in memory are used to restore the operational state values of a CEP engine and bring the CEP system back to the most up-to-date state that occurred prior to a defined condition (e.g., failure) that triggered the restoration. These embodiments may decrease the amount of memory that is being used by the CEP system for purposes of restoration and may furthermore decrease processor utilization by the CEP engine during the process of recovering the CEP engine and CEP system since the most relevant historical events are being used.

The operations and methods disclosed herein may be used in a Cloud processing environment and may be implemented at a Platform-as-a-service level for customers. These operations and methods can be agnostic to what kind of CEP system is used and may be used in an open source environment.

Further Operational Embodiments

Various embodiments have been described above in the context of the particular operations and methods of FIGS. 1-3. However other embodiments are not limited thereto. More general embodiments are now described below with regard to FIGS. 4-8.

Figure 4:
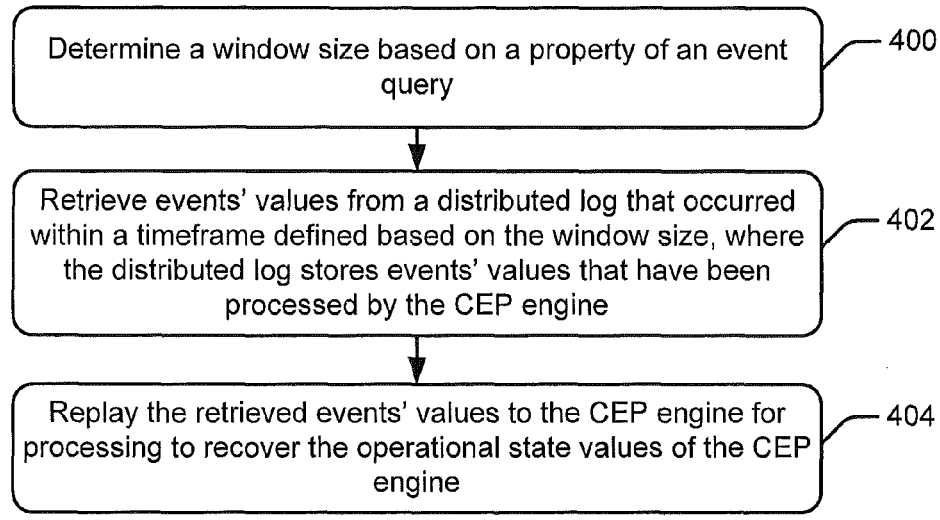
FIGS. 4-8 are flowcharts of methods that can be performed by a window manager in accordance with some embodiments.

FIG. 4 is a flowchart that illustrates operations and methods by a processing system to control recovery of operational state values of a CEP engine that processes values of events. Referring to FIG. 4, a window size is determined (block 400) based on a property of an event query. Events' values are retrieved (block 402) from a distributed log, where the event values are restricted to occurring within a timeframe defined based on the window size. The distributed log stores events' values that have been processed by the CEP engine. The retrieved events' values are replayed (block 404) to the CEP engine for processing to recover the operational state values of the event engine.

As explained above, the window size can be determined based on the time value contained in the event query. The time value can indicated time duration over which an operation defined based on the event query is to be periodically performed on an incoming stream of events' values. The operation defined by the event query may be to compute an average duration of SIP Invites for an entity defined by the event query.

Figure 5:
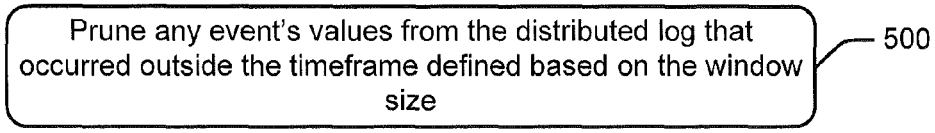

FIG. 5 is a flowchart that illustrates a method by the processing system to restrict the events' values that are used to recover the operational state values of the CEP engine. Referring to FIG. 5, any event's values are pruned (block 500) from the distributed log which occurred outside the timeframe defined based on the window size. The pruning (block 500) can be performed responsive to subsequent receipt of another event query from the producer 120 containing a different property than the event query. The pruning may include discarding any event's values from the distributed log that occurred earlier than the timeframe defined based on the window size.

Figure 6:
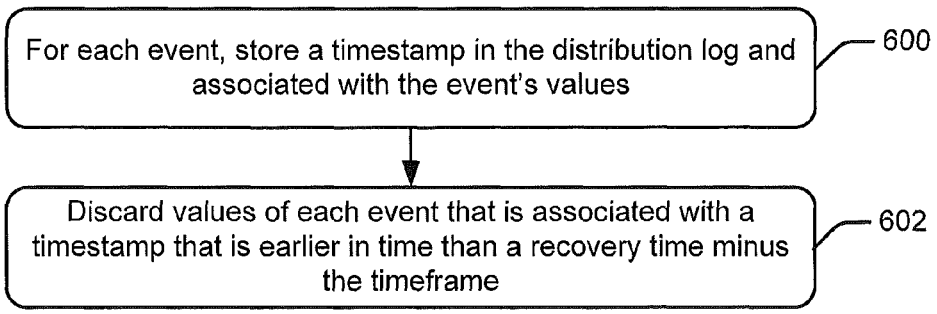

Referring to FIG. 6, the pruning may be performed based on timestamps that are stored (block 600), for each event, in the distributed log and associated with the event's values. Values of each event that is associated with a timestamp that is earlier in time than a recovery time minus the timeframe (defined based on the window size) are discarded (block 602).

Figure 7:
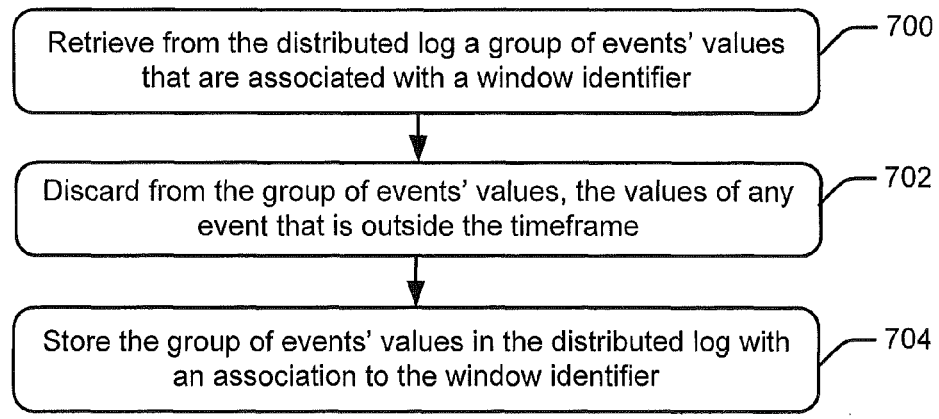

Referring to FIG. 7, the pruning may include retrieving (block 700) from the distributed log a group of events' values that are associated with a window identifier. Values of any events that are outside the timeframe are discarded (block 702) from the group of events' values. The group of events' values are stored (block 704) in the distributed log with an association to the window identifier.

Figure 8:
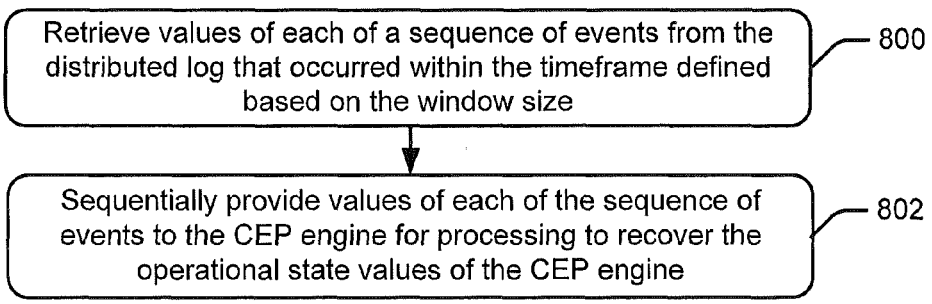

Referring to FIG. 8, replaying (block 404 of FIG. 4) of the retrieved events to the CEP engine may include retrieving (block 800) values of each of a sequence of events from the distributed log 110 that occurred within the timeframe defined based on the window size, and sequentially providing (block 802) values of each of the sequence of events to the CEP engine for processing to recover the operational state values of the CEP engine.

Example Processing Module

Figure 9:
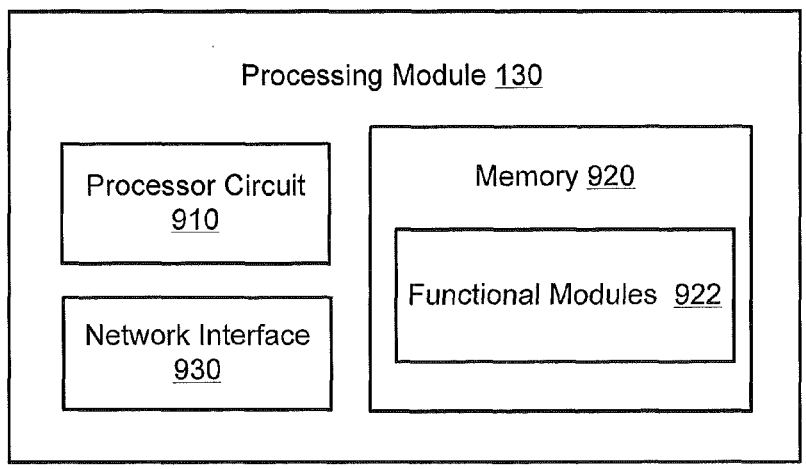
FIG. 9 is block diagram of an event processing module configured to operate according to some embodiments.

FIG. 9 is a block diagram of an example CEP module, such as the processing module 130 of FIGS. 1-3. The processing module 130 includes one or more processor circuitry/devices ("processor") 910, one or more memory circuitry/devices ("memory") 920, and one or more network interfaces 930. The one or more network interfaces 930 can include a wired and/or wireless network interface.

The processor 910 may include one or more instruction execution circuits, such as a general purpose processor and/or special purpose processor (e.g., microprocessor and/or digital signal processor) that may be collocated (e.g., within a same circuit package, connected to a same backplane, enclosed within a same computer housing, etc) or distributed across one or more data networks. The processor 910 is configured to execute computer program instructions read from functional modules 922 in the memory 920, described below as a computer readable medium, to perform some or all of the operations and methods that are described above for one or more of the embodiments disclosed herein, such as the embodiments of FIGS. 1-8. The functional modules 922 may include the operations and methods disclosed herein for the CEP engine 132 and/or the window manager 134.

Further Definitions and Embodiments:

In the above-description of various embodiments of the present invention, it is to be understood that the terminology used herein is for the purpose of describing particular embodiments only and is not intended to be limiting of the inventive concepts. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" or "/" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the non-transitory computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

The invention claimed is:

1. A method by a processing system to control recovery of operational state values of a complex event processing (CEP) engine that processes values of events, the method comprising:
determining a window size based on a property of an event query;
retrieving events' values, from a distributed log, that are restricted to occurring within a timeframe defined based on the window size, wherein the distributed log stores events' values that have been processed by the CEP engine; and
replaying the retrieved events' values to the CEP engine for processing to recover the operational state values of the CEP engine,
wherein the window size is determined based on a time value contained in the event query, the time value indicates a time duration over which an operation defined by the event query is to be periodically performed on an incoming stream of events values to the CEP engine, and the operation defined by the event query computes an average duration of SIP INVITES for an entity defined by the event query.

2. The method of claim 1, wherein the replaying comprises:
retrieving values of each of a sequence of events from the distributed log that occurred within the timeframe defined based on the window size; and
sequentially providing values of each of the sequence of events to the CEP engine for processing to recover the operational state values of the CEP engine.

3. A method by a processing system to control recovery of operational state values of a complex event processing (CEP) engine that processes values of events, the method comprising:
determining a window size based on a property of an event query;
retrieving events' values, from a distributed log, that are restricted to occurring within a timeframe defined based on the window size, wherein the distributed log stores events' values that have been processed by the CEP engine;
replaying the retrieved events' values to the CEP engine for processing to recover the operational state values of the CEP engine; and
pruning any event's values from the distributed log that occurred outside the timeframe defined based on the window size,
wherein:
the event query is received from a producer; and
the pruning is performed responsive to subsequent receipt of another event query from the producer containing a different property than the event query.

4. The method of claim 3, wherein:
for each event, a timestamp is stored in the distributed log and associated with the event's values; and
the pruning comprises discarding values of each event that is associated with a timestamp that is earlier in time than a recovery time minus a timeframe defined based on the window size.

5. A method by a processing system to control recovery of operational state values of a complex event processing (CEP) engine that processes values of events, the method comprising:
determining a window size based on a property of an event query;
retrieving events' values, from a distributed log, that are restricted to occurring within a timeframe defined based on the window size, wherein the distributed log stores events' values that have been processed by the CEP engine;
replaying the retrieved events' values to the CEP engine for processing to recover the operational state values of the CEP engine; and
pruning any event's values from the distributed log that occurred outside the timeframe defined based on the window size,
wherein the pruning comprises:
retrieving from the distributed log a group of events' values that are associated with a window identifier;
discarding from the group of events' values, the values of any event that is outside the timeframe; and
storing the group of events values in the distributed log with an association to the window identifier.

6. A processing system to control recovery of operational state values of a complex event processing (CEP) engine that processes values of events, the processing system comprising:

a processor; and a memory coupled to the processor and comprising computer readable program instructions that when executed by the processor causes the processor to perform operations comprising:

determining a window size based on a property of an event query;

retrieving events' values, from a distributed log, that are restricted to occurring within a timeframe defined based on the window size, wherein the distributed log stores events' values that have been processed by the CEP engine; and replaying the retrieved events' values to the CEP engine for processing to recover the operational state values of the CEP engine, wherein the window size is determined based on a time value contained in the event query, the time value indicates a time duration over which an operation defined by the event query is to be periodically performed on an incoming stream of events values to the CEP engine, and the operation defined by the event query computes an average duration of SIP INVITES for an entity defined by the event query.

7. The processing system of claim 6, wherein the replaying comprises:

retrieving values of each of a sequence of events from the distributed log that occurred within the timeframe defined based on the window size; and sequentially providing values of each of the sequence of events to the CEP engine for processing to recover the operational state values of the CEP engine.

8. A processing system to control recovery of operational state values of a complex event processing (CEP) engine that processes values of events, the processing system comprising:

a processor; and a memory coupled to the processor and comprising computer readable program instructions that when executed by the processor causes the processor to perform operations comprising:

determining a window size based on a property of an event query;

retrieving events' values, from a distributed log, that are restricted to occurring within a timeframe defined based on the window size, wherein the distributed log stores events' values that have been processed by the CEP engine;

replaying the retrieved events' values to the CEP engine for processing to recover the operational state values of the CEP engine; and pruning any event's values from the distributed log that occurred outside the timeframe defined based on the window size, wherein:

the event query is received from a producer; and the pruning is performed responsive to subsequent receipt of another event query from the producer containing a different property than the event query.

9. The processing system of claim 8, wherein:

for each event, a timestamp is stored in the distributed log and associated with the event's values; and the pruning comprises discarding values of each event that is associated with a timestamp that is earlier in time than a recovery time minus a timeframe defined based on the window size.

10. A processing system to control recovery of operational state values of a complex event processing (CEP) engine that processes values of events, the processing system comprising:

a processor; and a memory coupled to the processor and comprising computer readable program instructions that when executed by the processor causes the processor to perform operations comprising:

determining a window size based on a property of an event query;

retrieving events' values, from a distributed log, that are restricted to occurring within a timeframe defined based on the window size, wherein the distributed log stores events' values that have been processed by the CEP engine;

replaying the retrieved events' values to the CEP engine for processing to recover the operational state values of the CEP engine; and pruning any event's values from the distributed log that occurred outside the timeframe defined based on the window size, wherein the pruning comprises:

retrieving from the distributed log a group of events' values that are associated with a window identifier;

discarding from the group of events' values, the values of any event that is outside the timeframe; and storing the group of events' values in the distributed log with an association to the window identifier.

\* \* \* \* \*